(12) United States Patent
Shih et al.

(10) Patent No.: US 9,070,110 B2
(45) Date of Patent: Jun. 30, 2015

(54) IDENTIFICATION OF UNKNOWN SOCIAL MEDIA ASSETS

(75) Inventors: Clara Shih, San Francisco, CA (US);
Steve Garrity, Palo Alto, CA (US);
Kate Heddleston, San Francisco, CA (US); Chris Andrew, San Francisco, CA (US); Roger Hu, Los Altos, CA (US);
Robert MacCloy, San Francisco, CA (US); Yahui Jin, San Francisco, CA (US); Diana Freeman-Baer, Oakland, CA (US); Jaleh Bisharat, Piedmont, CA (US)

(73) Assignee: Hearsay Social, Inc., San Francisco, CA (US)

( * ) Notice: Subject to any disclaimer, the term of this patent is extended or adjusted under 35 U.S.C. 154(b) by 283 days.

(21) Appl. No.: 13/558,235

(22) Filed: Jul. 25, 2012

(65) Prior Publication Data

US 2013/0031176 A1    Jan. 31, 2013

Related U.S. Application Data

(60) Provisional application No. 61/512,329, filed on Jul. 27, 2011.

(51) Int. Cl.
*G06F 13/00*   (2006.01)
*G06Q 10/10*   (2012.01)
*G06Q 50/00*   (2012.01)

(52) U.S. Cl.
CPC ............... *G06Q 10/10* (2013.01); *G06Q 50/01* (2013.01)

(58) Field of Classification Search
CPC ........ G06Q 10/10; G06Q 50/01; H04L 29/06; H04L 29/08072; H04L 29/06027; H04L 12/581
USPC ......................................................... 709/204
See application file for complete search history.

(56) References Cited

U.S. PATENT DOCUMENTS

| 7,792,903 | B2 | 9/2010 | Fischer et al. | |
| 2008/0215633 | A1 | 9/2008 | Dunkeld et al. | |
| 2011/0106826 | A1 | 5/2011 | Swanbeck et al. | |
| 2012/0311034 | A1* | 12/2012 | Goldband et al. | ............ 709/204 |

* cited by examiner

*Primary Examiner* — Robert B Harrell
(74) *Attorney, Agent, or Firm* — Van Pelt, Yi & James LLP

(57) ABSTRACT

Identification of rogue social media assets is provided. In some embodiments, identification of rogue social media assets includes identifying a plurality of social media assets; comparing the plurality of social media assets with known social media assets to identify previously unknown social media assets; and displaying the identified previously unknown social media assets.

15 Claims, 14 Drawing Sheets

IDENTIFICATION OF UNKNOWN SOCIAL MEDIA ASSETS

CROSS REFERENCE TO OTHER APPLICATIONS

This application claims priority to U.S. Provisional Patent Application No. 61/512,329 entitled IDENTIFICATION OF ROGUE SOCIAL MEDIA ASSETS filed Jul. 27, 2011 which is incorporated herein by reference for all purposes.

BACKGROUND OF THE INVENTION

Social media includes various forms of electronic media for social interaction. Social media typically involves the use of social networks based on social graphs that can use various highly accessible and scalable communication techniques. For example, social media can include the use of web-based and mobile communication technologies to facilitate communication as well as various forms of interactive dialogue to provide for social interaction.

BRIEF DESCRIPTION OF THE DRAWINGS

Various embodiments of the invention are disclosed in the following detailed description and the accompanying drawings.

DETAILED DESCRIPTION

Figure 1:
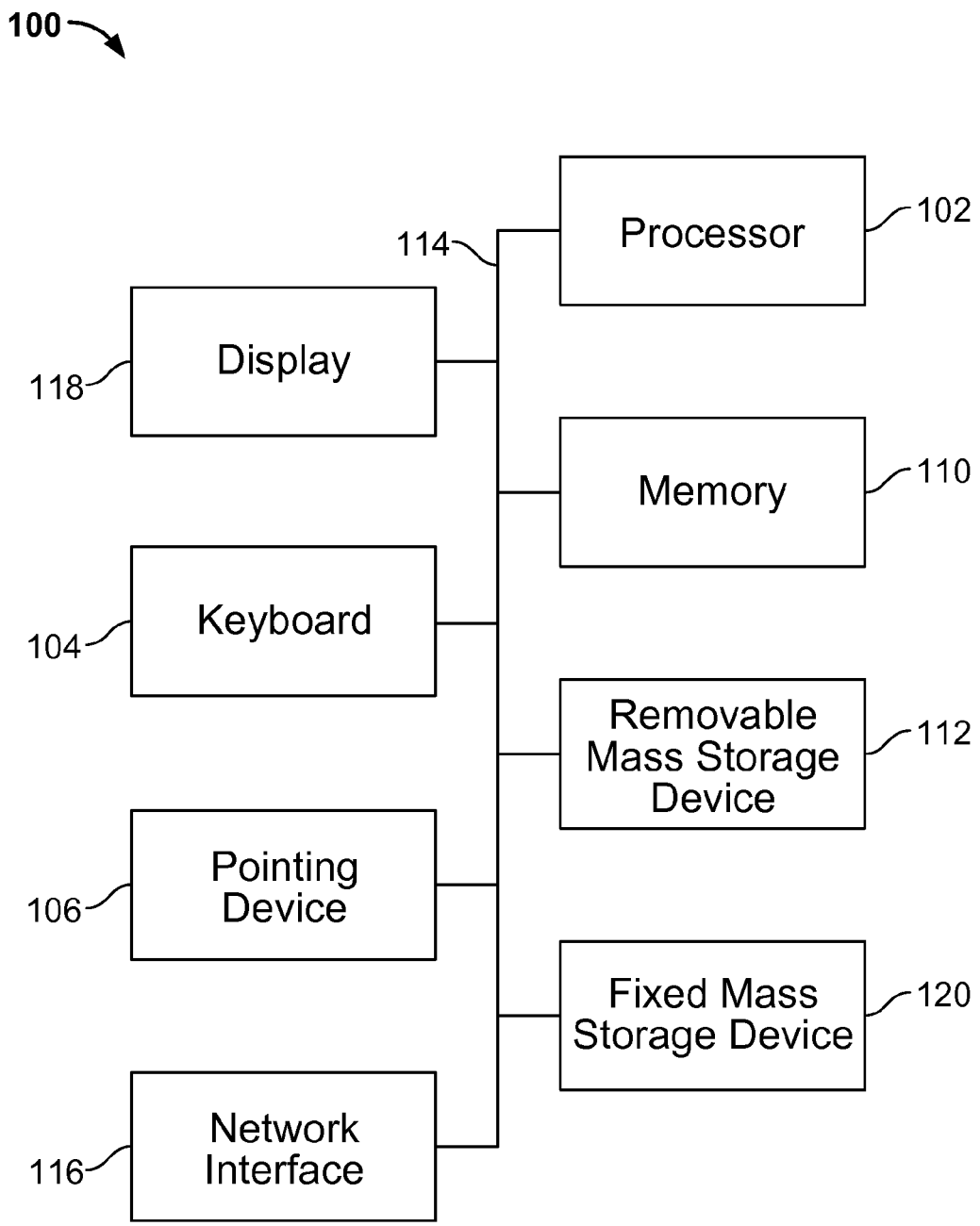
FIG. 1 is a functional diagram illustrating a programmed computer system for identification of rogue social media assets in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Social media is an increasingly important medium for communication and marketing. Social media can leverage the dynamic and contextual relevancy of social relationships (e.g., using social graphs associated with social identities on various social networks) to reach various target audiences, such as for targeted marketing or marketing campaigns. For example, based on certain knowledge about a potential customer, an advertiser can send targeted advertisements and promotions that are tailored for the potential customer's needs or interests. Because targeted marketing tends to yield better results for the advertiser than traditional non-targeted marketing, targeted marketing can be an effective way for businesses to spend their advertising budget. Social networking can also leverage network effects to efficiently and effectively increase the depth and relevance of such communication and/or marketing efforts using various forms of social media assets.

A variety of different social networks exist (e.g., Facebook®, LinkedIn®, Twitter®, Google+®, and various other social networks are available). These social networks can be used to provide social media assets for entities, such as corporations, educational institutions, governmental organizations, trade groups, ad hoc consortia, user groups, individual persons (e.g., athletes, celebrities, politicians, business leaders, and/or any other persons) and/or other forms of entities or groups interested in using social media assets as a communication medium and/or marketing medium and/or for commercial brand names or trade names. However, almost any person can use such social networks to create a social media asset that can be associated or appear to be associated with the entity (e.g., a Twitter® handle that appears to be associated with the entity, such as twitter.com/#!/ENTITY_NAME, or a Facebook® page for a user that appears to be for a person associated with the entity, such as www.facebook.com/ENTITY_NAME). For example, a customer of a company (e.g., who likes products from a particular corporation, or who dislikes product from that corporation) can create a social identity on one or more social networks, which can appear to be a social identity associated with the company. As another example, an employee of the corporation (e.g., a sales employee or a marketing employee) can create a social identity on one or more social networks, which can appear to be a social identity of a person associated with the company. However, the corporation may not even be aware of the existence of these social identities. Also, the corporation cannot marshal such social media assets in order to manage these social assets (e.g., to ensure compliance with various business rules or policies of the corporation and/or to advantageously use such social media assets for various communication and/or marketing efforts).

As such, existing techniques generally do not adequately meet the requirements of entities (e.g., businesses, educational institutions, governmental institutions, or other organizations) that need to accurately identify social media assets that are associated with their entity and/or to identify social media assets that are not properly authorized to be associated with their entity (e.g., rogue social media assets). Existing techniques also do not adequately meet the requirements of businesses that need to more effectively manage social media assets that are associated with their entity.

Accordingly, identification of rogue social media assets is provided. In some embodiments, identification of rogue social media assets includes identifying a plurality of social media assets; comparing the plurality of social media assets with known social media assets to identify previously unknown social media assets; and displaying the identified previously unknown social media assets.

In some embodiments, identification of rogue social media assets further includes receiving a confirmation input that at least one of the identified previously unknown social media assets is a rogue social media asset.

In some embodiments, identification of rogue social media assets further includes receiving an input to add at least one of the identified previously unknown social media assets to the known social media assets, in which the known social media assets are managed social media assets (e.g., automatically monitored to identify and report, periodically and/or based on an event trigger(s), compliance and/or violations based on various standard and/or configurable business rules and/or policies for social media assets).

In some embodiments, identification of rogue social media assets includes a rogue page finder that systematically identifies social media pages that represent, for example, a company's brand but remain outside corporate control. In some embodiments, infractions on managed and/or identified rogue pages (e.g., some of which could subject the company to fines or other risks) are also monitored and can be displayed (e.g., in a report, alert, dashboard, and/or other output or notification).

FIG. 1 is a functional diagram illustrating a programmed computer system for identification of rogue social media assets in accordance with some embodiments. As shown, FIG. 1 provides a functional diagram of a general purpose computer system programmed to perform identification of rogue social media assets in accordance with some embodiments. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements described below with respect to FIGS. 2 and 3 and/or executes/performs the process described below with respect to FIG. 4.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable non-transitory computer readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100, and is coupled either bidirectionally (read/write) or unidirectionally (read only) to processor 102. For example, storage 112 can also include computer-readable media such as magnetic tape, flash memory, PC cards, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems, as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection, as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Figure 2:
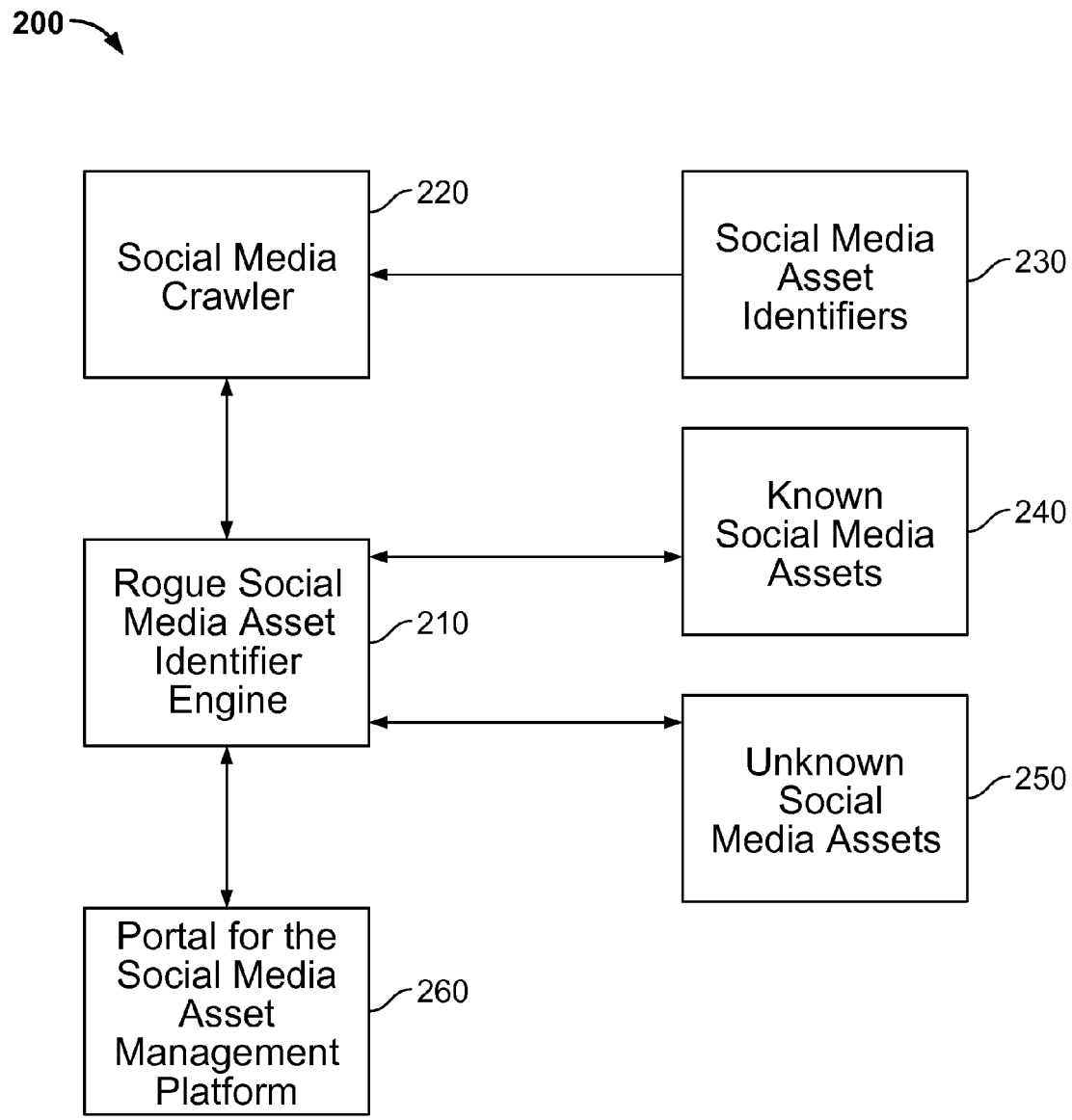
FIG. 2 is a functional diagram illustrating an architecture for providing identification of rogue social media assets in accordance with some embodiments.

FIG. 2 is a functional diagram illustrating an architecture for providing identification of rogue social media assets in accordance with some embodiments. As shown, a social media asset management platform 200 includes a rogue social media asset identifier engine 210 that communicates with a social media crawler 220. In some embodiments, the social media crawler performs various crawling techniques to determine whether various social media assets across various social networks may be associated with a particular entity based on social media asset identifiers 230 (e.g., keywords associated with the entity, employees associated with the entity, products or services associated with the entity, and/or based on various other criteria, rules, and/or heuristics that can be configured and/or updated, including, for example, meta data for a social media account such as a description of an entity's Twitter account that includes a Company Name and can then use that information to determine that such Twitter account(s) is/are associated with Company Name, keyword(s), video(s), photo(s), logo image(s) using, for example, OpenCV library for image/video analysis, based on threshold for posts related to Company Name, which can be a configurable parameter(s)). For example, an authorized user of the social media asset management platform 200 for the entity can configure and/or update the social media asset identifiers using a portal for the social media asset management platform 260 (e.g., a web-based portal that can be accessed from a web browser executed on a computer or a browser or mobile application executed on a smart phone or tablet computer). In some embodiments, the social media crawler is implemented using a subscription model (e.g., a push model), such as for example, a subscription to the Twitter® network in which Twitter then pushes data to the subscriber and Twitter also supports a subscription to a particular user(s) (e.g., similar to following but equivalent to an API version of follow for public tweets, and following such users is generally required to receive private tweets from the user(s)). Also, a Facebook group can be marked private, such that friending that group is generally required to see the private posts from the Facebook group (e.g., for private Facebook groups, the only public data is generally the number of members in that group). The social media crawler 220 can report (e.g., in response to time-based or other event-based triggers or based on demand, such as a user request) a potentially rogue social media assets results list to the rogue social media asset identifier engine 210. The rogue social media asset identifier engine 210 compares the potentially rogue social media assets results list to known social media assets 240 (e.g., a list of known social media assets that can be stored in a data store associated with various meta data, such as authorized user(s), geographical region, category information or other classification criteria, last activity on the social media asset, number of followers/fans/friends for the social media asset, compliance information, last monitored time stamp, last updated time stamp, associated marketing or communication campaigns, alert(s) status information, and/or other parameters or information). For example, an authorized user of the social media asset management platform 200 for the entity can configure and/or update the known social media assets using the portal 260. The media assets that are on the potentially rogue social media assets results list but are not on the known social media assets list are identified as unknown social media assets 250 (e.g., a list of unknown social media assets can be stored in a data store, which can be the same or a different data store for the known social media assets 240, and which can be associated with various meta data, such as names of admin(s)/employee(s) of the entity responsible for monitoring the social media asset, geographical region, category information or other classification criteria, last activity on the social media asset, number of followers/fans/friends for the social media asset, compliance information, last monitored time stamp, last updated time stamp, alert(s) status information, legal notice/take-down request information, and/or other parameters or information).

For example, the unknown social media assets 250 can be displayed using the portal 260. The authorized user for the entity (e.g., social media asset management administrator (admin)) can identify whether or not such assets are associated with the entity and authorized by the entity (e.g., and the known social media assets 240 and unknown social media assets 250 can be updated accordingly). The authorized user for the entity can then also indicate whether any of the known and/or unknown social media assets sets should be monitored and which monitoring policies should be applied (e.g., business rules and/or compliance policies) according to a specified monitoring criteria (e.g., time-based, such as once per day or once per week, or event-based, such as upon request by the admin or another event-based trigger). In some embodiments, the business rules and/or compliance policies can include various pre-configured or default rules (e.g., a list of keywords, such as certain profanity terms, religious terms, political terms, legal terms, and/or other terms) and can also include various configurable rules (e.g., to search for the use of certain keywords, such as "guaranteed" or names of certain competitors). In some embodiments, the authorized user can create new business rules and/or customized compliance policies using the portal 260. In some embodiments, regional-based monitoring/compliance policies can be applied to social media assets based on the associated region (e.g., to apply region-based customized polices and/or to address regional-based regulatory compliance requirements).

In some embodiments, the rogue social media asset identifier engine 210 analyzes components of various social media assets and generates reports that can also be based on a component level. For example, a Facebook® page can include various tabs. The rogue social media asset identifier engine 210 can report rogue tabs of various social media assets. The portal 260 can then also allow authorized users to view reports of any such rogue tabs and configure the monitoring and/or management of such rogue tabs. Similar techniques can be applied to various other component levels supported by other forms of social media assets (e.g., using public APIs or other techniques to crawl, identify, and monitor such components).

In some embodiments, the portal 260 displays compliance reports for managed social media assets. For example, known social media assets and/or identified rogue social media assets can be monitored and social media crawler 220 (e.g., or another similar function or component) can be used to apply a compliance policy to the monitored social media assets. The portal can display reports that indicate which monitored social media assets are out of compliance with the compliance policy (e.g., various compliance policies can be applied to different social media assets, using, for example, key words and/or regular expression-based techniques to determine whether various rules associated with each applied compliance policy have been violated).

In some embodiments, the rogue social media asset management platform can be accessed using a programming interface, such as an application programming interface (API) (e.g., a private API or a public API). For example, another application can access the rogue social media asset management platform via an API that allows for displaying some or all of the information as similarly described herein and/or for configuring and interacting with some or all of the functionality as similarly described herein.

Figure 3:
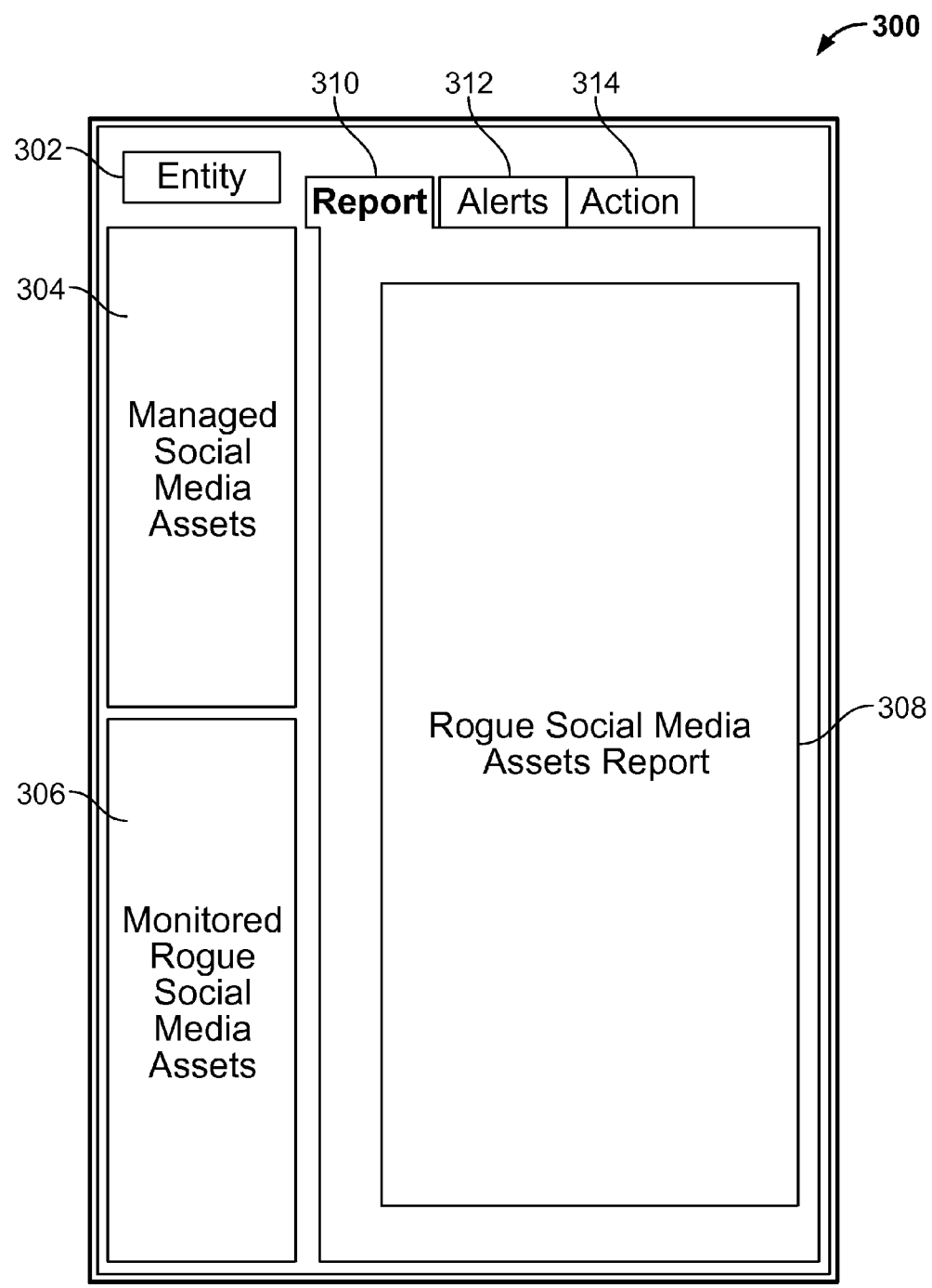
FIG. 3 is a functional diagram illustrating a portal for providing identification of rogue social media assets in accordance with some embodiments.

FIG. 3 is a functional diagram illustrating a portal for providing identification of rogue social media assets in accordance with some embodiments. As shown, a portal for a social media asset management platform 300 includes an entity identifier 302 (e.g., indicating the entity for which social media assets are currently being monitored and/or managed). The portal 300 also includes a list of managed social media assets 304 (e.g., a clickable or scrollable list of the managed social media assets, in which additional information about such managed social media assets can be provided based on associated meta data and/or monitored information, as similarly described herein). The portal 300 also includes a list of monitored rogue social media assets 306 (e.g., a clickable or scrollable list of the monitored rogue social media assets, in which additional information about such monitored rogue social media assets can be provided based on associated meta data and/or monitored information, as similarly described herein). The portal 300 includes various tabs, including a report tab 310 (e.g., for providing the authorized user an interface for viewing various reports, such as described herein), an alerts tab 312 (e.g., for providing the authorized user an interface for viewing various alerts, including new monitored rogue social media assets and/or new managed social media assets, such as described herein), and an action tab 314 (e.g., for providing the authorized user an interface for performing various actions, for example, notify/contact a user associated with that monitored rogue social media asset, such as a take-down request, or move the rogue social media assets to managed social media assets, such as by sending the user associated with that asset through regular set-up flow for new managed social media assets, and a history of actions performed with respect to one or more assets, such as described herein). As shown, the report tab 310 is selected, and a rogue social media assets report 308 is displayed in the portal interface.

In some embodiments, the portal is provided for use by authorized users (e.g., social media asset management admins) for the entity for identifying rogue social media assets and/or managing social media assets for the entity. The portal can allow the user to view an output of potentially rogue social media assets (e.g., on demand, based on a periodic reporting or event-based reporting configuration setting(s)). The portal can also allow the user to select one or more of the potentially rogue social media assets for various actions. For example, the user can select an identified potentially rogue social media asset and provide a confirmation input to verify that the identified potentially rogue social media asset is a rogue social media asset or to indicate that the social media asset is not a rogue social media asset (e.g., but should be added to a monitored or managed social media asset list, and to possibly trigger a workflow to determine an authorized owner or responsible owner for managing the social media asset for the entity). A list of confirmed rogue social media assets can then be displayed (e.g., displayed or output in a potentially rogue social media assets log, report and/or other form of notification or output). The authorized user can also select and/or configure various monitoring policies for continuing to monitor confirmed rogue social media assets.

In some cases, a confirmed rogue social media asset can be reported to an admin at the entity responsible for managing social media assets. The confirmed rogue social media asset may be a candidate for reporting to the entity's legal department (e.g., to determine whether or not a cease and desist letter or take-down notice/request should be issued for that rogue social media asset). The confirmed rogue social media asset may be an unauthorized social media asset that is associated with an employee of the entity, but which is not authorized to be associated with the entity (e.g., violates a social media asset business rule or policy, such as certain employees may not be permitted to post certain content associated with the entity). In that case, the employee and/or a management contact for the employee can be contacted and informed of the social media asset compliance policy. In some cases, a rogue social media asset can be monitored to determine a region associated with the rogue social media asset (e.g., California, United States, South Korea, Germany, and/or any other geographical region) using various techniques (e.g., geographical information or content on the social media asset, IP address information or host information or user associated with the social media asset, and/or various other techniques). If a region can be determined for the rogue social media asset, then the entity can apply a monitoring/action policy that assigns an appropriate regional social media asset admin to be responsible for addressing the rogue social media asset. In some cases, a name of the person identified as the owner, sponsor, and/or otherwise associated with the rogue social media asset can be compared against the entity's employee list to determine whether or not the rogue social media asset can be determined to potentially be associated with a current (e.g., or possibly former) employee of the entity. Various other monitoring/action policies can be applied based on a categorization of the social media asset and/or based on various other criteria, rules, and/or heuristics that can be configured and/or customized for the entity.

Figure 4:
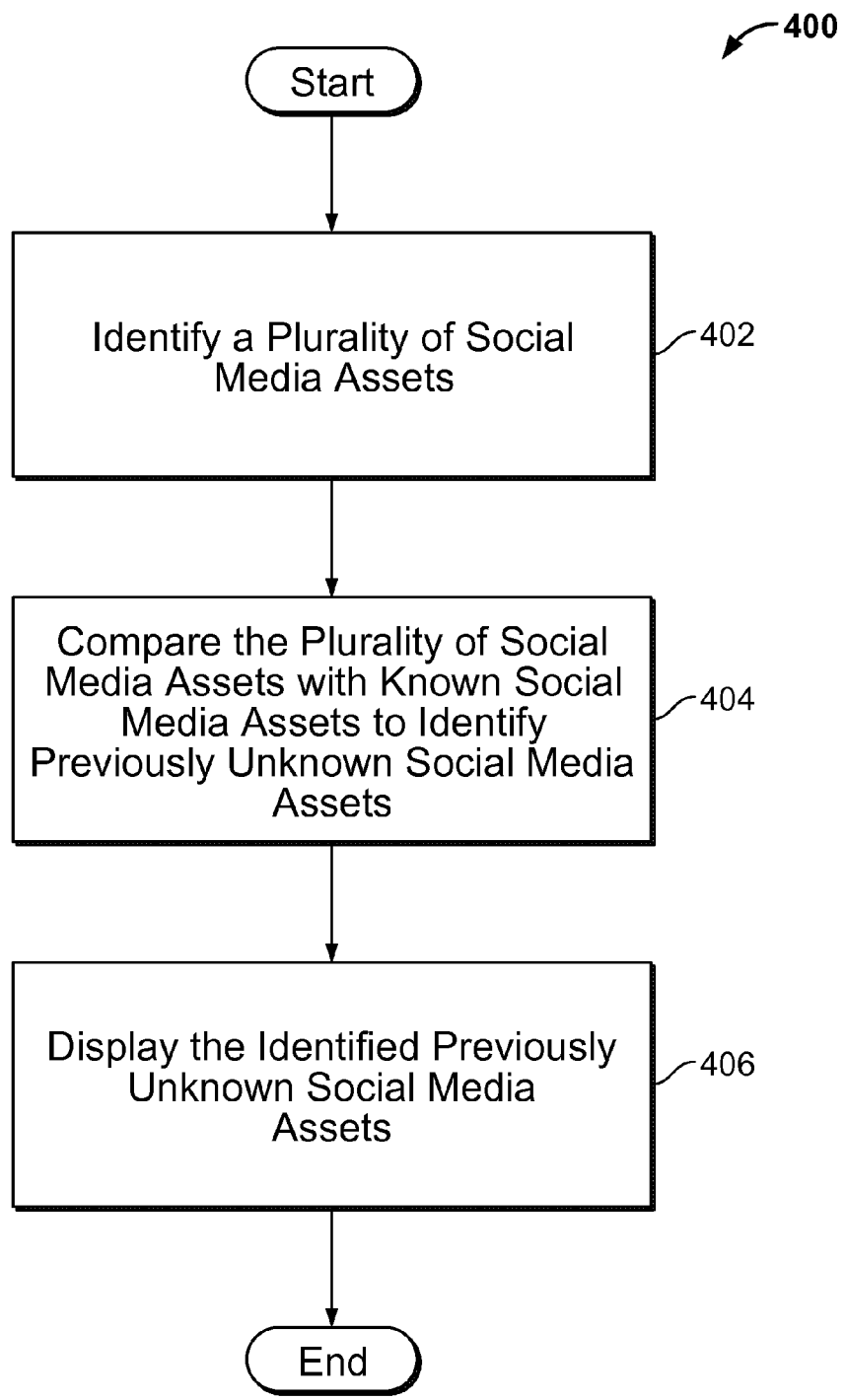
FIG. 4 is a flow diagram illustrating identification of rogue social media assets in accordance with some embodiments.

FIG. 4 is a flow diagram illustrating identification of rogue social media assets in accordance with some embodiments. As shown, process 400 begins at 402 where identifying a plurality of social media assets is performed. At 404, comparing the plurality of social media assets with known social media assets to identify previously unknown social media assets is performed. At 406, displaying the identified previously unknown social media assets is performed.

Figure 5:
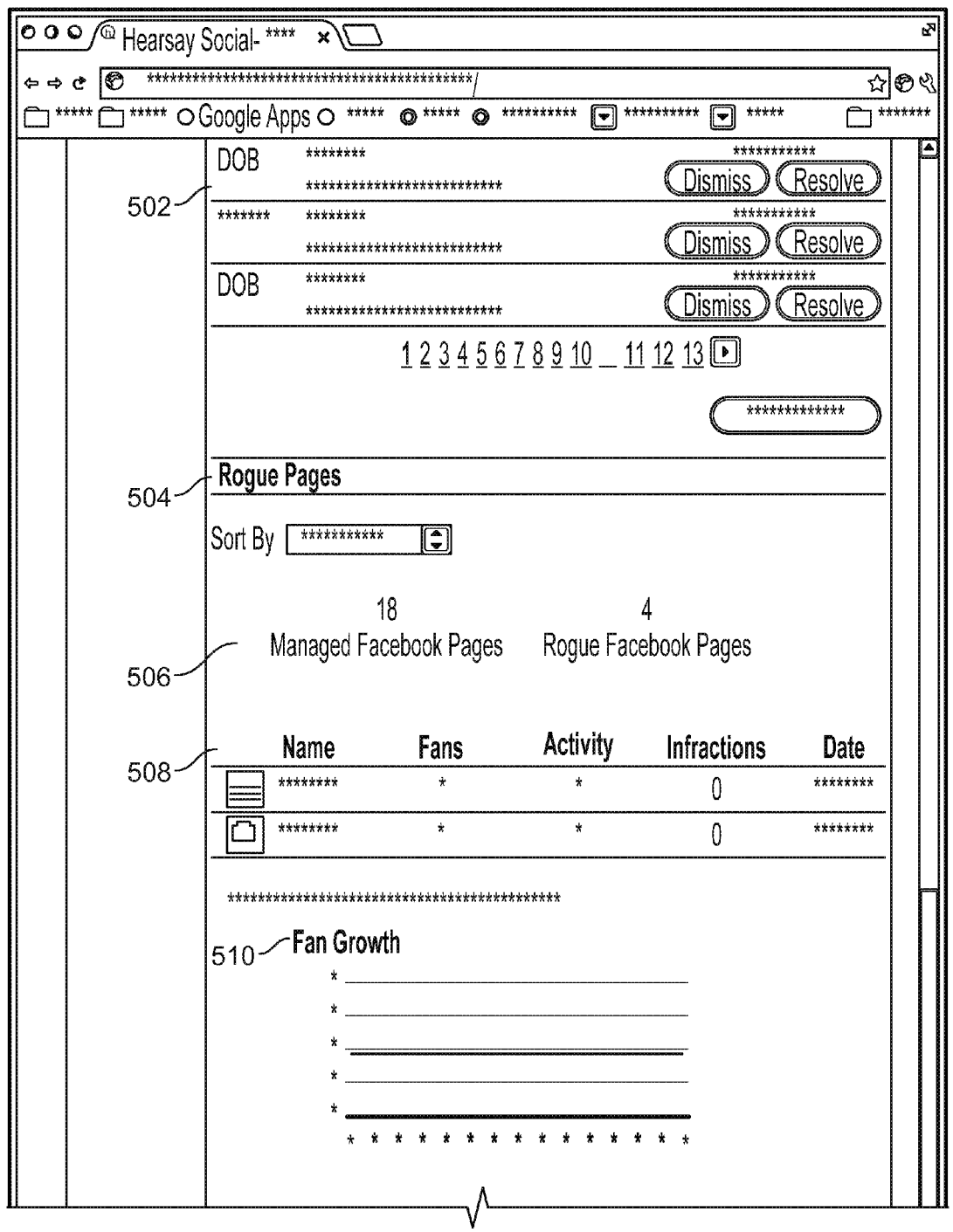
FIG. 5 is a functional diagram illustrating a graphical user interface for identification of rogue social media assets in accordance with some embodiments.
Figure 5:
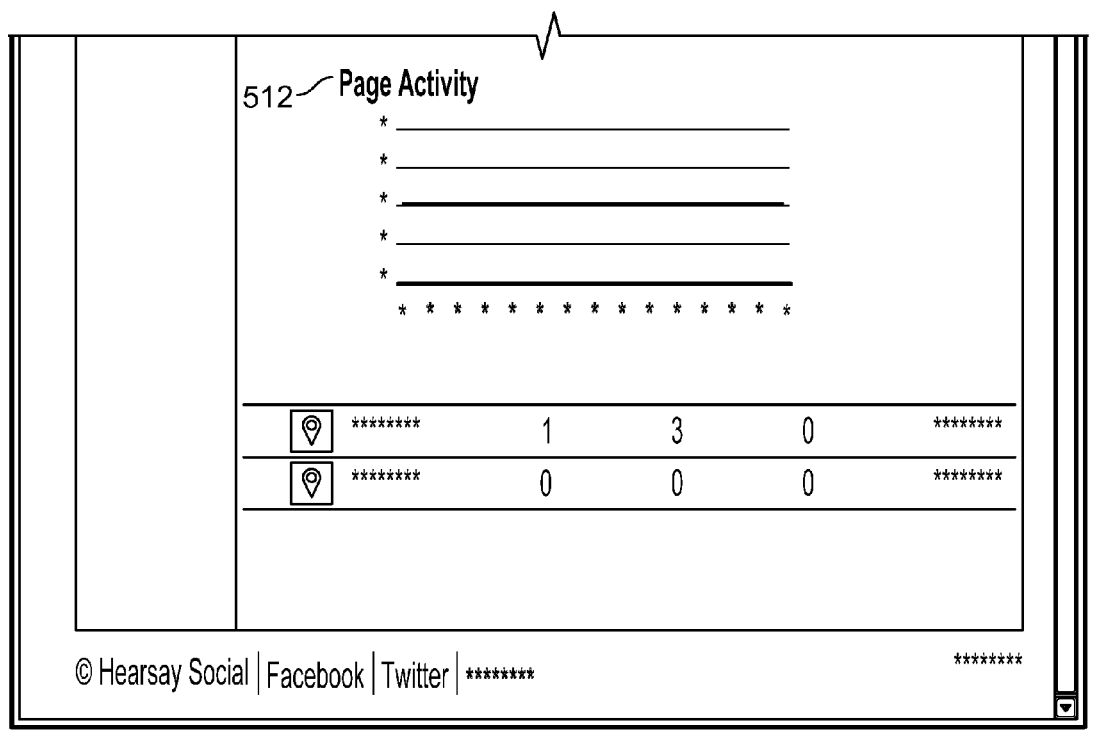

FIG. 5 is a functional diagram illustrating a graphical user interface for identification of rogue social media assets in accordance with some embodiments. As shown, at a section 502 of a screen shot of the graphical user interface, a list of alerts are displayed that can be dismissed or resolved. At a section 504 of the screen shot of the graphical user interface, a summary of rogue pages is presented as a rogue pages dashboard display. In particular, the number of managed Facebook pages (18) and the number of identified rogue pages (4) are displayed at 506. Also, for each managed Facebook page, a status summary chart is provided at 508 indicating various monitored information that is maintained as historical data, such as shown including the number of fans, the activity on the Facebook page, the number of infractions (e.g., based on a compliance policy), and a date (e.g., last updated/monitored date). At 510, a Fan Growth chart is displayed. At 512, a Page Activity chart is displayed.

Figure 6:
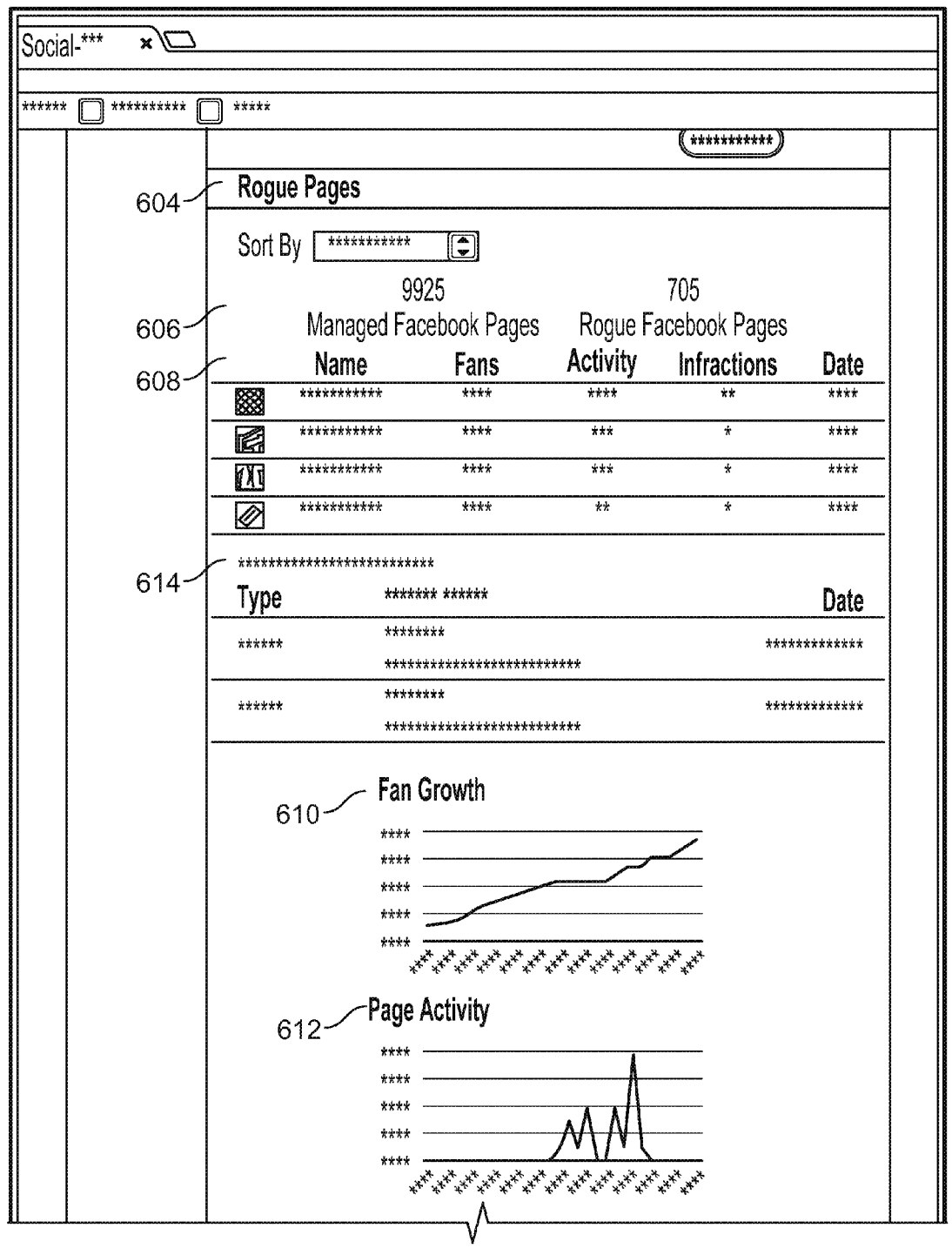
FIG. 6 is a functional diagram illustrating another graphical user interface for identification of rogue social media assets in accordance with some embodiments.
Figure 6:
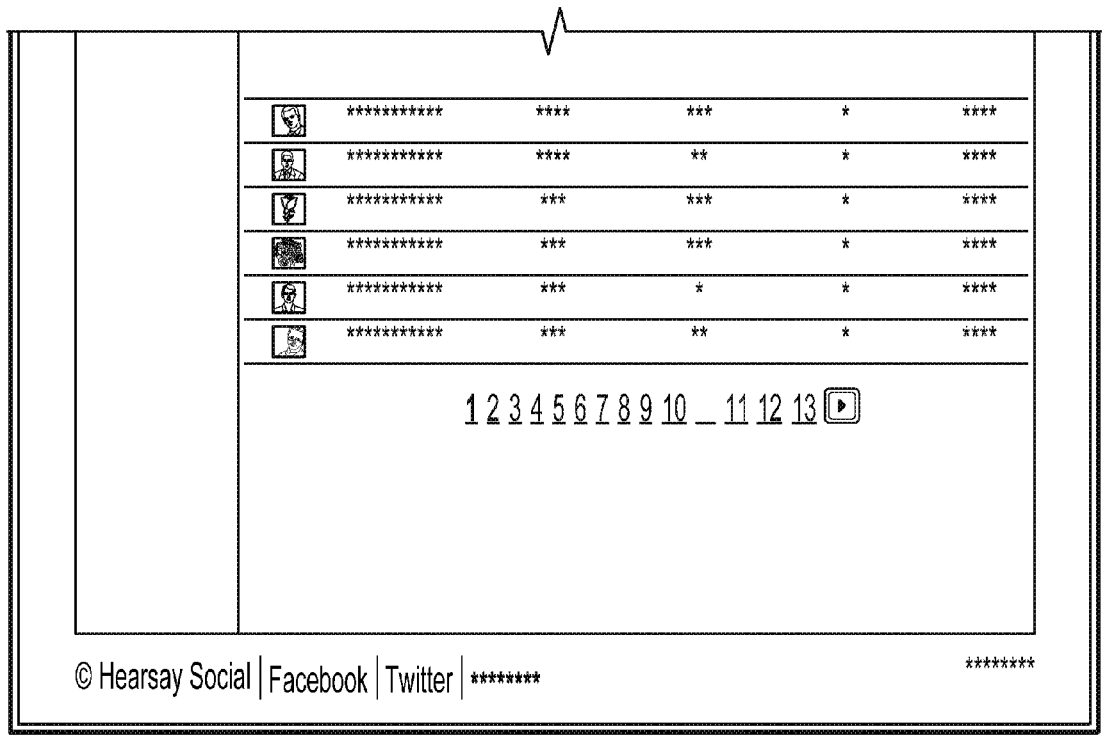

FIG. 6 is a functional diagram illustrating another graphical user interface for identification of rogue social media assets in accordance with some embodiments. As shown, at a section 604 of the screen shot of the graphical user interface, a summary of rogue pages is presented as a rogue pages dashboard display. In particular, the number of managed pages (5925) and the number of identified rogue pages (705) are displayed at 606. Also, for each managed Facebook page, a status summary chart is provided at 608 indicating various monitored information that is maintained as historical data, such as shown including the number of fans, the activity on the Facebook page, the number of infractions (e.g., based on a compliance policy), and a date (e.g., last updated/monitored date). As also shown in the status summary chart 608, the infractions column entries can include a drill-down option to examine each number of infractions (e.g., to view a list of each and further view specific content captured that triggered that infraction, including for example an archive of the rogue page that triggered the infraction). At 610, a Fan Growth chart is displayed. At 612, a Page Activity chart is displayed. At 614, detailed information for reported potential infractions is provided.

Figure 7A:
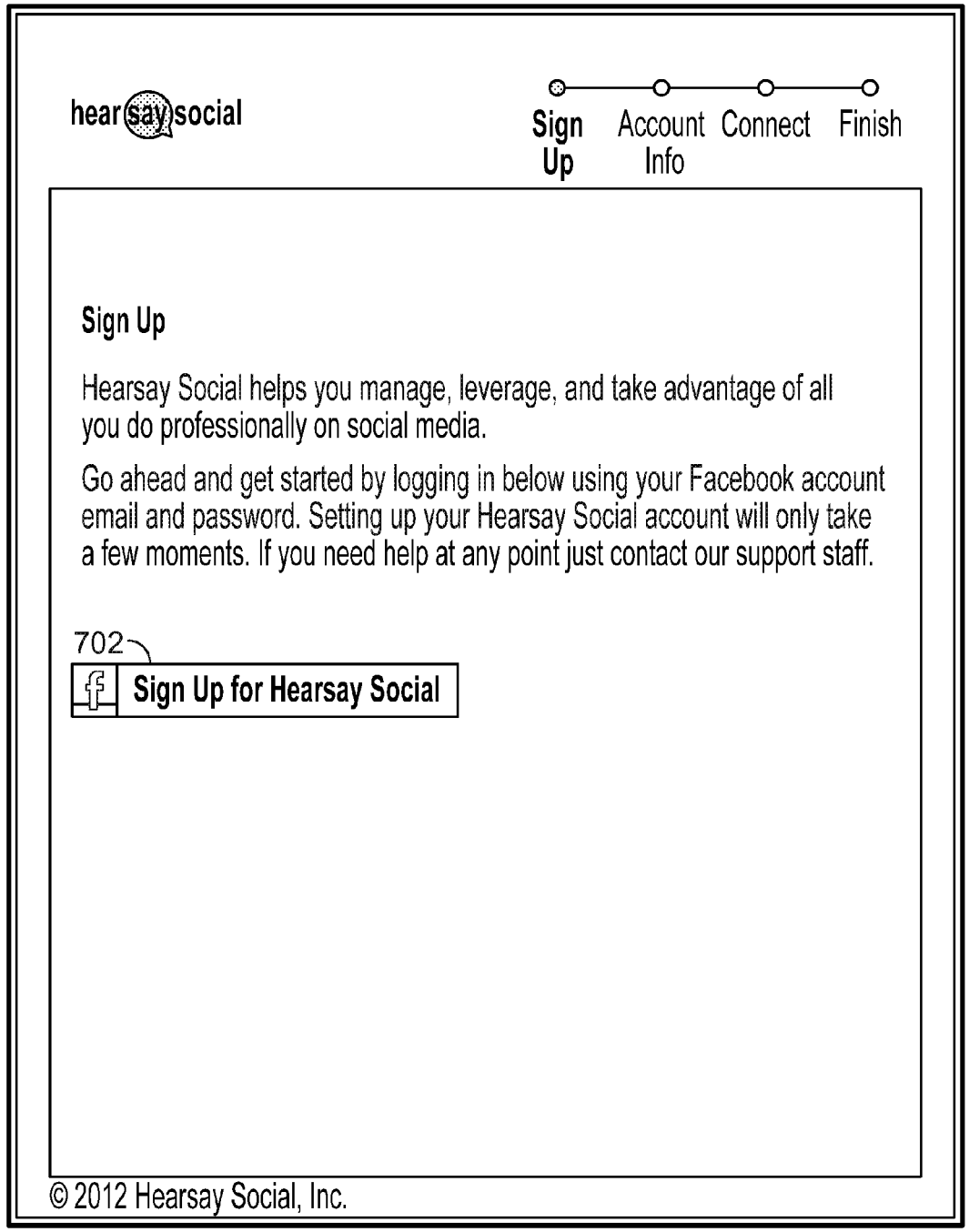
FIGS. 7A-7D are functional diagrams illustrating a graphical user interface for a set-up flow for identification of rogue social media assets in accordance with some embodiments.
Figure 7B:
Figure 7C:
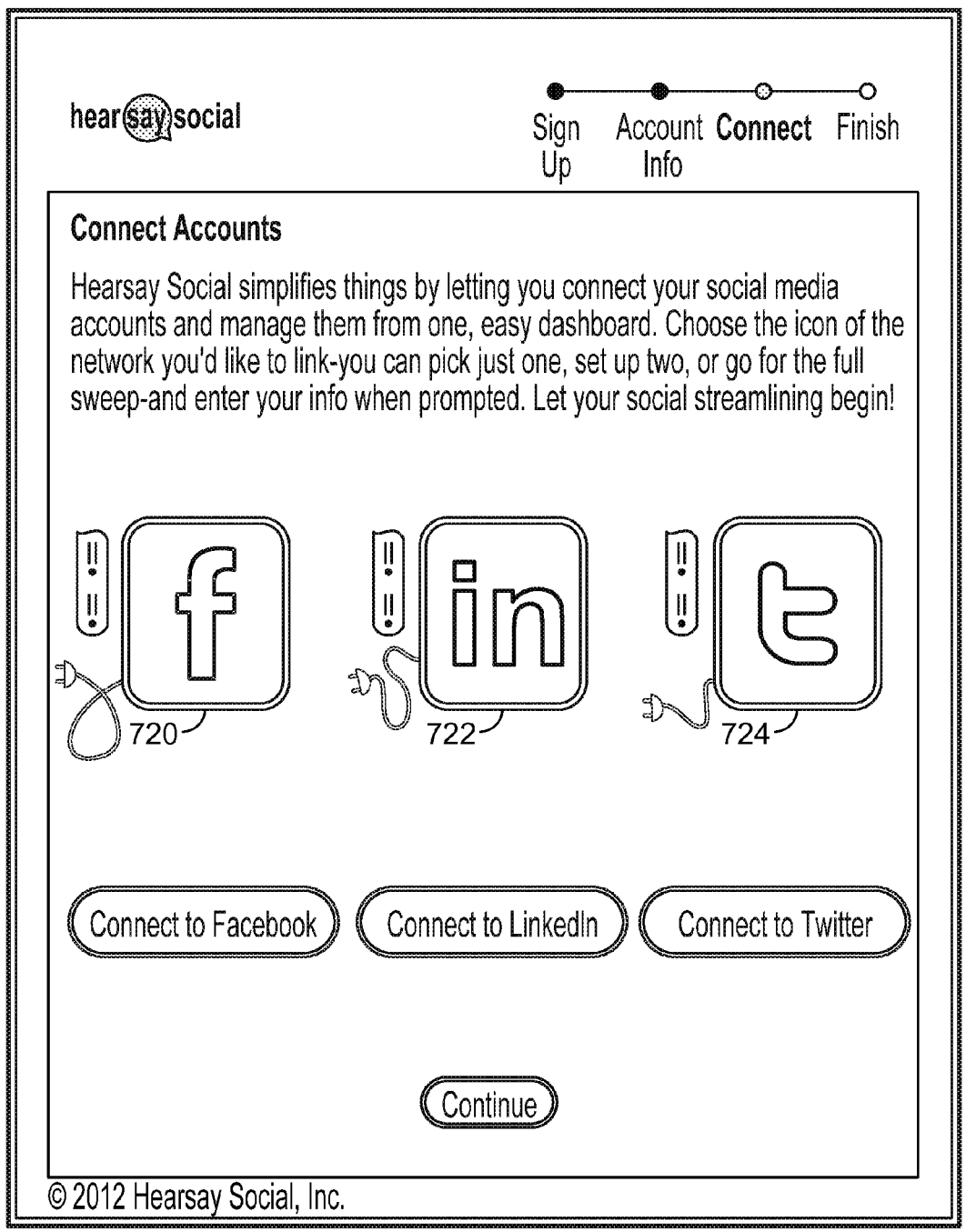
Figure 7D:
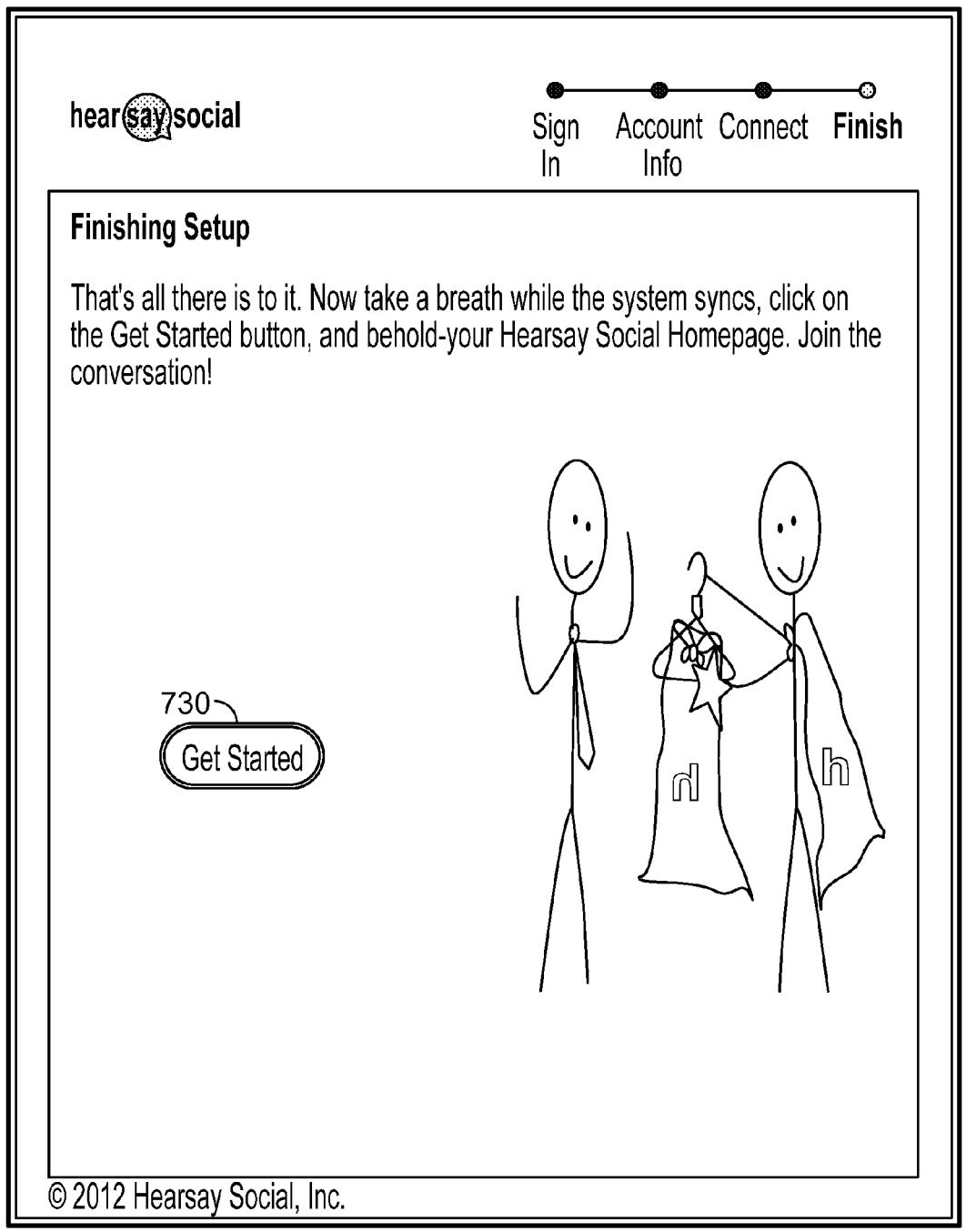

FIGS. 7A-7D are functional diagrams illustrating a graphical user interface for a set-up flow for identification of rogue social media assets in accordance with some embodiments. In some embodiments, a set-up flow for a social media asset management platform is provided for facilitating the transition of identified rogue social media assets to monitored and/or managed social media assets. In some embodiments, various social media assets can be identified, monitored, and/or managed across different networks (e.g., social networks), including, for example, Facebook (e.g., profiles, pages, and/or any other objects), LinkedIn (e.g., profiles, pages, and/or any other objects), Google (e.g., profiles, pages, and/or any other objects), Twitter (e.g., profiles and/or any other objects), and various other social networks. Referring to FIG. 7A, an account can be setup for managing social media assets using a social media asset management platform, in which a user can setup an account using an existing social network account, such as Facebook, as shown at 702. Referring to FIG. 7B, account information is received via user profile information form entry as shown at 710 and entity information (e.g., business, corporate, firm, and/or other entity related information) is received via entity information form entry as shown at 712. Referring to FIG. 7C, multiple social media accounts can be connected and managed from a centralized dashboard. As part of a set-up flow, a user can choose an icon of the network (e.g., social networks that have media assets of interest for identifying rogue social media assets for identifying, monitoring, managing, etc.) that the user would like to link to the centralized dashboard for the account, such as shown, using a Facebook icon 720, LinkedIn icon 722, and a Twitter icon 724, in which one, two, or more/all of the social networks can be linked to the centralized dashboard for the account. For example, providing such a centralized dashboard streamlines the management of social media assets across multiple social networks. Referring to FIG. 7D, the set-up flow process is completed, and the user can get started using the social media asset management platform by selecting the icons 730 as shown.

Figure 8:
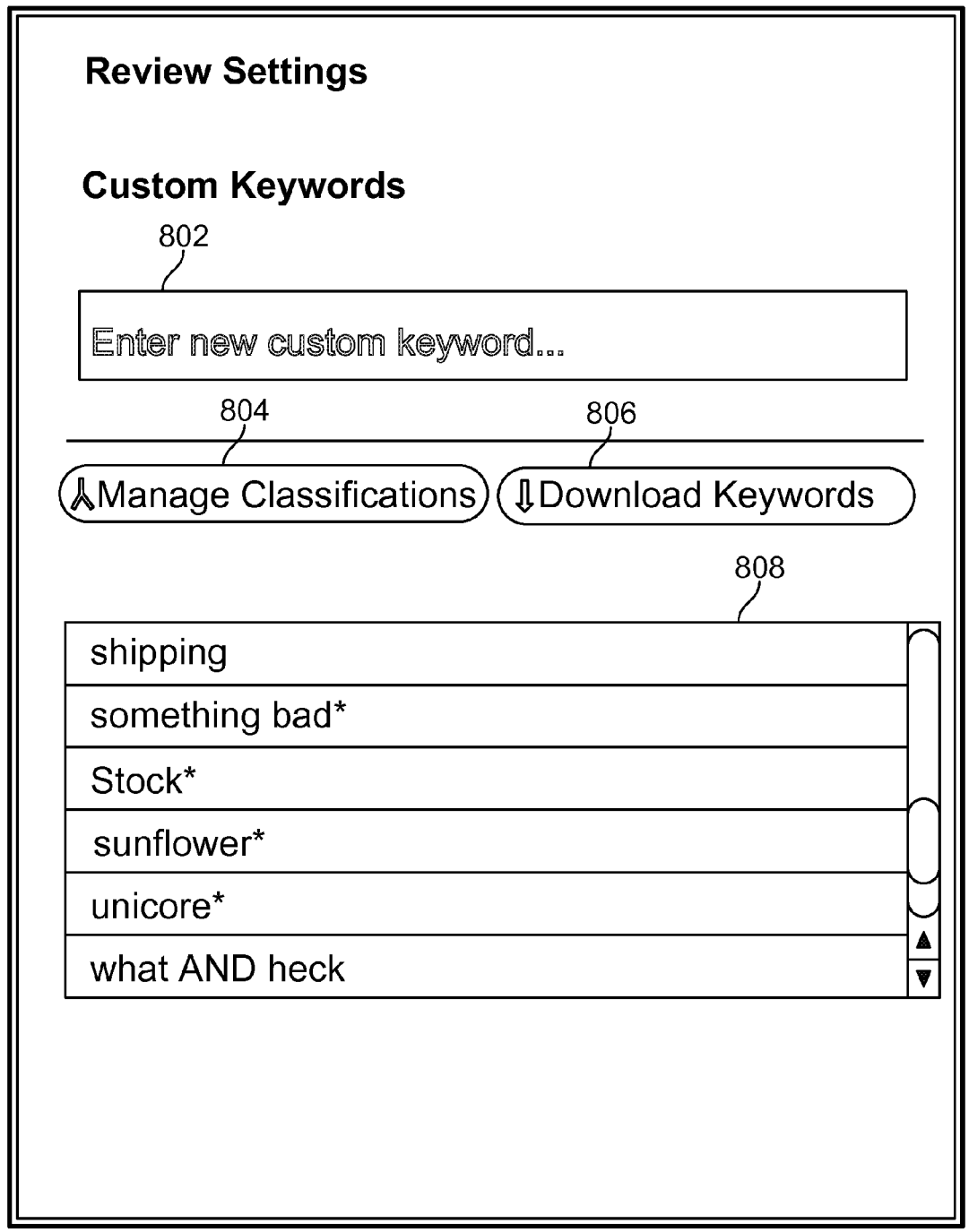
FIG. 8 is a functional diagram illustrating a graphical user interface for infraction keyword management for monitoring and/or managing social media assets in accordance with some embodiments.

FIG. 8 is a functional diagram illustrating a graphical user interface for infraction keyword management for monitoring and/or managing social media assets in accordance with some embodiments. In some embodiments, various infraction types/classification can be configured using a social media asset management platform. In some embodiments, a user can enter keywords as shown at 802 that can be used for identifying infractions associated with rogue, monitored, and/or managed social media assets. In some embodiments, a user can upload a set of terms for infractions (e.g., in a CSV formatted file), including, for example, a set of profanity or otherwise inappropriate terms, legal terms (e.g., guaranteed, warranty, refund, or other legal related language, such as based on an industry type), and/or any other terms of interest for monitoring and/or managing social media assets. In some embodiments, infractions can be determined using one or more of the keywords. In some embodiments, a threshold can be used for such keyword matching (e.g., using a default and/or configurable threshold parameter). In some embodiments, keywords can be organized based on classifications (e.g., categories or classifications of keywords, such as legal, profanity, etc.). As shown at 804, such classifications can be managed. As shown at 806, keywords can be downloaded. As shown at 808, a list of keywords is displayed.

Figure 9:
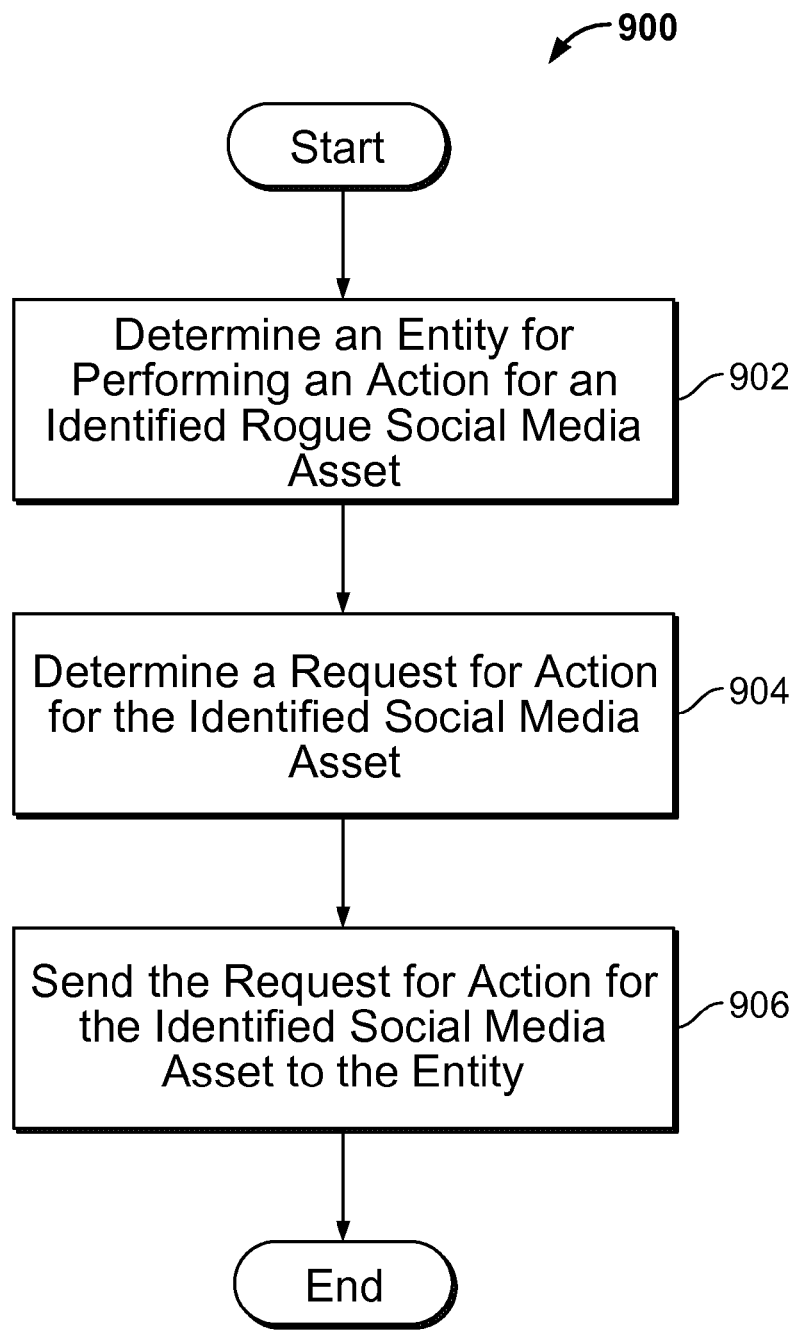
FIG. 9 is a flow diagram illustrating an automated workflow for performing actions responsive to identification of rogue social media assets in accordance with some embodiments.

FIG. 9 is a flow diagram illustrating an automated workflow 900 for performing actions responsive to identification of rogue social media assets in accordance with some embodiments. As shown, process 900 begins at 902 where an entity for performing an action for an identified rogue social media asset is determined. For example, an automated workflow for routing rogue pages can include identifying an appropriate employee at the company for handling the rogue social media asset (e.g., using semantic/content analysis-based matching of rogue pages to certain employees, using geographical-based criteria for matching rogue pages to certain employees, using configured based configured-based criteria, and/or using various other techniques as described herein). At 904, a request for action for the identified social media asset is determined. At 906, the request for action for the identified social media asset is sent to the entity. For example, an action request can be routed to the employee identified as responsible for managing or handling any issues associated with that rogue page (e.g., a request for action to that employee, such as district/geo-based brand/marketing manager or legal, such as if content analysis shows brand related and/or copyright/trademark potential infringement related issues).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
identify a plurality of social media web page assets, wherein each of the plurality of social media web page assets corresponds to a social identity on a social network that is part of or appears to be part of an entity;
compare the plurality of social media web page assets with known social media web page assets to identify previously unknown social media web page assets; and
display the identified previously unknown social media web page assets; and
a memory coupled to the processor and configured to provide the processor with instructions.

2. The system recited in claim 1, wherein the processor is further configured to:
receive a confirmation input that at least one of the identified previously unknown social media web page assets is a rogue social media web page asset.

3. The system recited in claim 1, wherein the processor is further configured to:
receive a confirmation input that at least one of the identified previously unknown social media web page assets is a rogue social media web page asset; and
receive an input to monitor the rogue social media web page asset.

4. The system recited in claim 1, wherein the processor is further configured to:
receive an input to add at least one of the identified previously unknown social media web page assets to the known social media web page assets, wherein the known social media web page assets are managed social media web page assets.

5. The system recited in claim 1, wherein the processor is further configured to:
receive an input to add at least one of the identified previously unknown social media web page assets to the known social media web page assets, wherein the known social media web page assets are managed social media web page assets; and
receive an input to monitor at least one of the identified previously unknown social media web page assets.

6. The system recited in claim 1, wherein the processor is further configured to:
receive an input to add at least one of the identified previously unknown social media web page assets to the known social media web page assets, wherein the known social media web page assets are managed social media web page assets;
automatically monitor the managed social media web page assets; and
generate a report that identifies compliance and/or violations related to one or more of the managed social media web page assets based on a policy for social media web page assets.

7. The system recited in claim 1, wherein the processor is further configured to:
execute a rogue page finder to identify one or more social media web page pages that are associated or to appear to be associated with the entity, and are not under control of the entity or are not authorized by the entity.

8. The system recited in claim 1, wherein the processor is further configured to:
receive an input to add at least one of the identified previously unknown social media web page assets to the known social media web page assets, wherein the known social media web page assets are managed social media web page assets;
automatically monitor the managed social media web page assets;
execute a rogue page finder to identify one or more social media web page pages that are associated or to appear to be associated with the entity, and are not under control of the entity or are not authorized by the entity; and
generate a report that identifies compliance and/or violations related to one or more of the managed social media web page assets and/or rogue web page assets based on a policy for social media web page assets.

9. The system recited in claim 1, wherein the processor is further configured to:
execute a social media crawler to crawl a plurality of social networks to determine whether one or more social media web pages is associated or appears to be associated with the entity based on one or more keywords associated with the entity, one or more employees associated with the entity, and/or one or more products or services associated with the entity.

10. A method, comprising:
identifying a plurality of social media web page assets, wherein each of the plurality of social media web page assets corresponds to a social identity on a social network that is part of or appears to be part of an entity;
comparing the plurality of social media web page assets with known social media web page assets to identify previously unknown social media web page assets using a hardware processor; and
displaying the identified previously unknown social media web page assets.

11. The method recited in claim 10, further comprising:
receiving a confirmation input that at least one of the identified previously unknown social media asset web page assets is a rogue social media web page asset.

12. The method recited in claim 10, further comprising:
receiving an input to add at least one of the identified previously unknown social media asset web page assets to the known social media web page assets, wherein the known social media web page assets are managed social media web page assets.

13. A computer program product, the computer program product being embodied in a computer readable storage medium and comprising computer instructions for:
identifying a plurality of social media web page assets, wherein each of the plurality of social media web page assets corresponds to a social identity on a social network that is part of or appears to be part of an entity;
comparing the plurality of social media web page assets with known social media web page assets to identify previously unknown social media web page assets; and
displaying the identified previously unknown social media web page assets.

14. The computer program product recited in claim 13, further comprising:
receiving a confirmation input that at least one of the identified previously unknown social media web page assets is a rogue social media web page asset.

15. The computer program product recited in claim 13, further comprising:
receiving an input to add at least one of the identified previously unknown social media web page assets to the known social media web page assets, wherein the known social media web page assets are managed social media web page assets.

* * * * *

UNITED STATES PATENT AND TRADEMARK OFFICE
CERTIFICATE OF CORRECTION

PATENT NO. : 9,070,110 B2
APPLICATION NO. : 13/558235
DATED : June 30, 2015
INVENTOR(S) : Shih et al.

Page 1 of 1

It is certified that error appears in the above-identified patent and that said Letters Patent is hereby corrected as shown below:

Claims:

In column 12, claim 12, line 39 after "social media" delete "asset".

Signed and Sealed this
Fifth Day of July, 2016

Michelle K. Lee
*Director of the United States Patent and Trademark Office*